(12) United States Patent
Inauen

(10) Patent No.: US 11,432,526 B2
(45) Date of Patent: Sep. 6, 2022

(54) EXCREMENT-DRYING DEVICE

(71) Applicant: Urs Inauen, Appenzell (CH)

(72) Inventor: Urs Inauen, Appenzell (CH)

(*) Notice: Subject to any disclaimer, the term of this patent is extended or adjusted under 35 U.S.C. 154(b) by 53 days.

(21) Appl. No.: 16/610,348

(22) PCT Filed: May 2, 2018

(86) PCT No.: PCT/EP2018/061177
§ 371 (c)(1),
(2) Date: Nov. 1, 2019

(87) PCT Pub. No.: WO2018/202692
PCT Pub. Date: Nov. 8, 2018

(65) Prior Publication Data
US 2020/0137979 A1 May 7, 2020

(30) Foreign Application Priority Data
May 3, 2017 (EP) .................................. 17169253

(51) Int. Cl.
*A01K 1/01* (2006.01)
*A01K 31/04* (2006.01)
*F26B 3/04* (2006.01)

(52) U.S. Cl.
CPC ............ *A01K 1/0135* (2013.01); *A01K 31/04* (2013.01); *F26B 3/04* (2013.01); *F26B 2200/12* (2013.01)

(58) Field of Classification Search
CPC ...... F26B 3/04; F26B 2200/12; A01K 1/0135; A01K 31/04
(Continued)

(56) References Cited

U.S. PATENT DOCUMENTS 3,385,266 A * 5/1968 Launder ................. A01K 31/04
119/442
3,697,056 A * 10/1972 Prins, Sr. ................. C05F 3/02
432/130
(Continued)

FOREIGN PATENT DOCUMENTS

EP          0 047 043 A2    3/1982
EP          0 108 230 A1    5/1984
(Continued)

OTHER PUBLICATIONS

Communication dated Nov. 7, 2017 from European Patent Office in EP Application No. 17169253.6.
(Continued)

*Primary Examiner* — Stephen M Gravini
(74) *Attorney, Agent, or Firm* — Sughrue Mion, PLLC

(57) ABSTRACT

An excrement-drying device (1) for animal stalls, such as poultry stalls, comprises an excrement conveyor belt (2) for conveying the excrement along a conveying direction (F), wherein the excrement conveyor belt (2) extends over a conveying length (L) and has a top side (10) for receiving the excrement (K), and a drying unit (3) with at least one discharge element (4), which has at least one air nozzle (5) for blowing air onto the excrement (K) lying on the excrement conveyor belt (2) in order to dry the excrement (K). The top side (10) for receiving the excrement (K) of the excrement conveyor belt (2) is divided into several excrement conveyor belt sections (TB1, TB2) arranged one after the other in the conveying direction (F); and the at least one discharge element (4) is arranged in such a way that air is blown onto only one of said excrement conveyor belt sections (TB1, TB2).

22 Claims, 15 Drawing Sheets

(58) Field of Classification Search
USPC .......................................................... 34/523
See application file for complete search history.

(56) References Cited

U.S. PATENT DOCUMENTS

| | | | |
|---|---|---|---|
| 3,900,006 A | 8/1975 | Shockley, Jr. | |
| 4,123,992 A * | 11/1978 | Laurenz | A01K 1/0128 |
| | | | 119/451 |
| 4,357,904 A * | 11/1982 | Kuhlmann | A01K 31/04 |
| | | | 119/442 |
| 4,706,607 A * | 11/1987 | Ijichi | A01K 1/01 |
| | | | 119/447 |
| 4,708,294 A * | 11/1987 | Endom | A01B 33/021 |
| | | | 241/27 |
| 4,909,825 A | 3/1990 | Eigner | |
| 5,487,226 A * | 1/1996 | Hoover | F26B 17/04 |
| | | | 34/167 |
| 5,737,850 A | 4/1998 | Hendrix | |
| 8,056,255 B2 * | 11/2011 | Smith | F26B 25/22 |
| | | | 34/214 |
| 2013/0047930 A1 | 2/2013 | Risser | |
| 2015/0208617 A1 | 7/2015 | Bussema et al. | |
| 2018/0153206 A1 * | 6/2018 | Eastin | A23P 10/30 |
| 2020/0137979 A1 * | 5/2020 | Inauen | A01K 31/04 |

FOREIGN PATENT DOCUMENTS

| | | | |
|---|---|---|---|
| EP | 0 360 083 A2 | 3/1990 | |
| EP | 0 740 900 A1 | 11/1996 | |
| EP | 1747717 A1 * | 1/2007 | ........... A01K 1/0218 |
| FR | 2 715 533 A1 | 8/1995 | |
| NL | 8 502 494 A | 4/1987 | |
| WO | WO-2009040330 A2 * | 4/2009 | ........... C12M 23/56 |
| WO | WO-2018202692 A1 * | 11/2018 | ........... A01K 31/17 |

OTHER PUBLICATIONS

International Search Report for PCT/EP2018/061177, dated Jul. 27, 2018.

* cited by examiner

EXCREMENT-DRYING DEVICE

CROSS REFERENCE TO RELATED APPLICATIONS

This application is a National Stage of International Application No. PCT/EP2018/061177 filed May 2, 2018, claiming priority based on European Patent Application No. 17 169 253.6 filed May 3, 2017.

TECHNICAL FIELD

The present invention relates to an excrement-drying installation for livestock barns, as claimed in the preamble of claim 1.

PRIOR ART

It is known from the prior art that excrement arising in livestock barns such as, for example, in poultry barns, is treated, in particular dried.

A facility which comprises an excrement transportation belt and an aeration device is known from EP 0 047 043. The aeration device extends so as to be parallel to the excrement transportation belt and exposes the excrement lying on the excrement transportation belt to dry air such that said excrement dries. The aeration device herein extends across the entire length of the excrement transportation belt.

It is disadvantageous in the system according to EP 0 047 043 that the aeration device introduces a very large amount of air across the entire length of the excrement transportation belt. On account thereof, a lot of energy is used, this representing a disadvantage in economic terms. Moreover, the excrement is not particularly well aerated.

DISCLOSURE OF THE INVENTION

Proceeding from this prior art, the invention is based on an object of providing a method as well as a device which overcome the disadvantages of the prior art. In particular, the method, or the device, respectively, is to be operated in an economical manner.

This object is achieved by the subject matter of claim 1. Accordingly, an excrement-drying device for livestock barns such as poultry barns comprises an excrement transportation belt for conveying the excrement along a conveying direction, wherein the excrement transportation belt extends across a conveying length and has an upper side for receiving the excrement, and a drying unit having at least one dispensing element which for drying the excrement has at least one air nozzle or a multiplicity of air nozzles for spraying air onto the excrement lying on the excrement transportation belt. The upper side of the excrement transportation belt for receiving the excrement is divided into a plurality of excrement transportation belt portions which lie behind one another in the conveying direction. Each of the excrement transportation belt portions occupies a sub-area of the entire upper side. The at least one dispensing element is disposed in such a manner that said dispensing element acts on an operative region which in terms of area corresponds to said sub-area. On account thereof, the excrement by way of the conveyor installation is moved into the operative region of the drying unit, or of the dispensing device, respectively, and can be dried therein.

As the air used for drying acts only across an excrement transportation belt portion which corresponds to part of the entire upper side of the excrement transportation belt, the advantage results, that not the entire length of the excrement transportation belt is exposed to air. The arrangement of an air intake duct which extends across the entire length of an excrement transportation belt is dispensed with. On account thereof, the system can be produced and also operated in a more economical manner. Moreover, the air inflow is improved on account of the corresponding arrangement, this allowing the excrement to dry more rapidly.

The system can be advantageously operated because the excrement transportation belt can be moved onward in a cycled manner, and thus, excrement transportation belt portion by excrement transport belt portion can be moved in a cycled manner into the operative region of the drying unit, or of the dispensing device, respectively.

Furthermore, the advantage results, that the volumetric flow of the air can be chosen so as to be higher than in the case of facilities in which the aeration device extends across the entire length of the excrement transportation belt, because less consideration has to be paid to potential air turbulences which lead to a draft in the barn. This has the advantage that the creation of ammonia on account of slow drying can be counteracted, wherein the livestock situated in the barn are simultaneously protected against a harmful draft.

The excrement-drying device is preferably operated over 24 hours, this becoming advantageous for the drying of the excrement. In particular, less ammonia is formed. This operation in turn is rendered economically possible because the air is introduced only selectively to an excrement transportation belt portion of the upper side of the excrement transportation belt.

On account of the 24 hour operation, a further advantage results, in that the excrement is dried before the formation of ammonia becomes most intense.

The installation of an exhaust air purification system can be dispensed with on account of the reduction in the formation of ammonia. Nevertheless, an exhaust air purification system can still be arranged, depending on the dimensions.

On account of the 24 hour operation, a further advantage results, in that the amount of excrement lying on the excrement transportation belt becomes smaller in comparison to facilities which are moved once per day.

The term "upper side" is understood to be the area on which the excrement lies and which in the installed position is oriented upward. The excrement transportation belt is preferably a conveyor belt. The term "excrement transportation belt portion" is understood to be a sub-region, or a sub-area, respectively, of the entire upper side of the excrement transportation belt.

According to a first variant, the drying unit is disposed above the excrement transportation belt and acts thus on the excrement transportation belt. In other words, the upper side of the excrement transportation belt for receiving the excrement is divided into a plurality of excrement transportation belt portions that lie behind one another in the conveying direction. The at least one dispensing element is disposed in such a manner that only one of said excrement transportation belt portions is sprayed with air.

According to a second variant, the drying unit is disposed above a drying belt which is configured separately from said excrement transportation belt, wherein the drying belt preferably has a length which corresponds to that of said excrement transportation belt portion. The drying belt adjoins said excrement transportation belt and is supplied by the latter with excrement to be dried. The advantage of the separate drying belt in the present case is that the drying belt can be configured for the actual drying. In particular, the drying belt can be provided with an opening, for example, this facilitating the drying.

The excrement transportation belt portion preferably extends across the entire width and across a sub-length of the excrement transportation belt. The excrement transportation belt portion thus has a width which corresponds to that of the excrement transportation belt, and said excrement transportation belt portion has a length which corresponds to part of the total length of the excrement transportation belt.

The at least one dispensing element is preferably disposed in such a manner that the entire width of the excrement transportation belt, or of the drying belt, respectively, is capable of being sprayed with air. The at least one dispensing element particularly preferably extends across said sub-area, or within the excrement transportation belt portion, respectively, and is in particular disposed in such a manner that the entire width of the excrement transportation belt, or of the drying belt, respectively, is capable of being sprayed with air. However, not the entire length of the excrement transportation belt is sprayed with air. By spraying the entire width it is ensured that the excrement to be dried is capable of being sprayed with air well in the excrement transportation belt portion, or on the drying belt, respectively.

The dispensing element preferably extends only across a sub-length of the excrement transportation belt, or across the drying belt, respectively, the latter having a length which corresponds to the sub-length. A sub-length represents a fraction of the conveying length of the excrement transportation belt. The dispensing element can extend in the conveying direction and/or transversely to the conveying direction across said sub-length of the excrement transportation belt, or across the drying belt, respectively.

The width of the excrement transportation belt, or of the drying belt, respectively, is preferably between 0.5 and 3.5 meters, in particular between 1 and 2.8 meters.

The dispensing element is preferably disposed so as to be locationally fixed in relation to the excrement transportation belt, or the drying belt, respectively, wherein the excrement transportation belt, or the drying belt, respectively, moves relative to the fixed dispensing element. The dispensing element is thus fixed in relation to the excrement belt, or to the drying belt, respectively, this enabling the dispensing element to be supplied with air in a simpler manner. Moreover, only the excrement transportation belt, or the drying belt, respectively, is displaced, which due to its configuration is anyway suitable for this purpose, on account of which the drying unit can be configured in a comparatively simple manner.

The at least one dispensing element is preferably disposed in the end region of the excrement transportation belt. The end region of the excrement transportation belt is the region where the excrement drops from the excrement transportation belt. This means that the excrement transportation belt portion in which the excrement is dried essentially represents the end of the excrement transportation belt. This is advantageous because the drying unit can be disposed at the periphery of a barn or even outside the barn, this again being advantageous in terms of the issue of drafts.

In a first embodiment, the at least one dispensing element extends from the end of the excrement transportation belt, or of the drying belt, respectively, against the conveying direction.

In a second embodiment, the at least one dispensing element extends across the excrement transportation belt from one or both sides of the excrement transportation belt, or of the drying belt, respectively, transversely to the conveying direction.

The at least one dispensing element in a variant of the first and the second embodiment can also be disposed in a serpentine shape or a meandering shape.

According to the first or the second embodiment, respectively, the at least one dispensing element extends preferably parallel to and/or transversely to the conveying direction in a spaced apart manner from the upper side of the excrement transportation belt, or of the drying belt, respectively.

According to the first or the second embodiment, respectively, the at least one dispensing element has the shape of a pipe. The pipe can have a circular or an oval or an angular cross-section. The air nozzles herein penetrate the side wall of the pipe. A plurality of nozzles are preferably disposed in the direction of the pipe axis, in particular so as to be uniformly spaced apart.

A nozzle is preferably understood to be an opening or a hole through which air can exit.

According to the first or the second embodiment, respectively, the pipe preferably extends along a longitudinal axis which is configured as a straight line.

According to the first or the second embodiment, respectively, a multiplicity of dispensing elements are preferably disposed. On account thereof, the air can be distributed in an optimal manner over the excrement transportation belt portion, or the drying belt, respectively.

According to the first or the second embodiment, the dispensing elements are preferably disposed so as to be mutually parallel. In a first variant, the dispensing elements run parallel to the conveying direction. In a second variant, the dispensing elements run transversely to the conveying direction. Dispensing elements, independently of the orientation thereof, are disposed in such a manner that the entire operative region is sprayed with air by said dispensing elements.

According to the first or the second embodiment, respectively, the dispensing elements preferably are arranged in a uniformly spaced apart manner. In the first embodiment, the dispensing elements, starting from the center of the excrement transportation belt, or of the drying belt, respectively, are particularly preferably arranged in a uniformly spaced apart manner beside one another.

In the first embodiment, the distance between the upper side of the excrement transportation belt, or of the drying belt, respectively, and the dispensing elements, when viewed transversely to the conveying direction, preferably decreases toward the outside as the distance from the center of the excrement transportation belt, or of the drying belt, respectively, increases. On account thereof, the distribution of air can be optimized. In the second embodiment, the distance between the upper side of the excrement transportation belt, or of the drying belt, respectively, and the dispensing elements is substantially consistent among all dispensing elements.

According to the first or the second embodiment, respectively, a plurality of nozzles, when viewed in the direction of the dispensing element, thus preferably in the direction of the conveying direction and/or transversely to the conveying direction, are preferably disposed at a spacing of 2 to 5 centimeters between each other.

According to the first or the second embodiment, the nozzles preferably have a diameter of 4 to 20 millimeters. The nozzle can also be configured as a nozzle slot.

According to a third embodiment, the at least one dispensing element is disposed so as to be lateral to the excrement transportation belt, or beside the excrement transportation belt, respectively, wherein the at least one air nozzle sprays the excrement transversely to the conveying direction. The at least one dispensing element, when viewed in the conveying direction, lies beside the excrement transportation belt. Said third embodiment has the advantage that a larger installation space is available with respect to the configuration of the dispensing element. An additional advantage lies in that an improved airflow can be achieved.

According to the third embodiment, a plurality of dispensing elements are preferably disposed behind one another in the direction of the conveying direction. On account thereof, the operative region, or said sub-area, respectively, can be enlarged.

The dispensing elements are preferably disposed on both sides to the left and the right of the excrement transportation belt. This means that at least one dispensing element acts from the left on the excrement transportation belt, and at least one further dispensing element acts from the right on the excrement transportation belt.

The dispensing elements in terms of the conveying direction are particularly preferably disposed in a mutually alternating manner. This means that a dispensing element disposed on the right side is offset in relation to a dispensing element disposed on the left side. The arrangement is particularly preferably such that the airflow of the one dispensing element does not interfere with the airflow of the other dispensing element. The dispensing elements on the left and the right are preferably always mutually offset at the same spacing. The intermediate spacing between two dispensing elements on the same side corresponds substantially to the length of one dispensing element, or is slightly larger or slightly smaller than the latter. Comprehensive spraying of said sub-area with air can thus be achieved.

In another variant, the dispensing elements are disposed in a mutually opposite manner.

The dispensing elements according to the third embodiment preferably comprise air nozzles in the shape of slots, or in the shape of sequentially disposed nozzle openings, wherein the air nozzles are oriented in the conveying direction.

The dispensing elements according to the third embodiment preferably comprise at least one ventilator which suctions ambient air and dispenses the latter by way of the air nozzles. A plurality of ventilators are preferably disposed per dispensing element.

The at least one dispensing element is preferably disposed so as to be locationally fixed in relation to the excrement transportation belt, or to the drying belt, respectively, wherein the excrement transportation belt, or the drying belt, respectively, moves relative to the fixed dispensing element. The respective advantages have already been discussed herein.

The air is preferably at the ambient temperature. Alternatively, the air may also be heated. To this end, a heat exchanger, in particular an air heat exchanger, can be used.

The volumetric flow of the air dispensed by the dispensing element is preferably 100 to 700 m^3/hour per square meter of area.

The drying unit preferably comprises a collector pipe which is fluidically connected to the at least one dispensing element according to the first or the second embodiment, respectively, wherein the at least one dispensing element is supplied with air by way of the collector pipe.

The collector pipe is preferably orthogonal to the at least one dispensing element.

In the first embodiment, the collector pipe at the end of the excrement transportation belt, or of the drying belt, respectively, is preferably transverse to the conveying direction. In the second embodiment, the collector pipe preferably runs so as to be parallel to the conveying direction and is preferably disposed beside the excrement transportation belt, or the drying belt, respectively.

A ventilator by way of which air is conveyed into the collector pipe is preferably disposed in or on the collector pipe. The ventilator is in particular a pressurized ventilator. The air can be barn air or barn air mixed with external air.

The cross section of the collector pipe corresponds substantially to the sum of all cross sections of the dispensing elements.

The diameter of the collector pipe, or the length of the sides in the case of a rectangular cross section of the collector pipe, respectively, is preferably in the range from 200 to 600 millimeters.

Said excrement transportation belt portion, or the drying belt, respectively, when viewed in the conveying direction preferably has a length of 3 meters to 6 meters, or up to 10 meters. However, the excrement transportation belt portion, or the drying belt, respectively, can also be longer. Depending on the width of the belts, the operative region is accordingly preferably between 3 to 25.0 m^2.

The length of said excrement transportation belt portion, when viewed in the conveying direction, is preferably chosen in such a manner that in case of one complete revolution of the excrement transportation belt within 24 hours at a dwell time of 1 to 6 hours each excrement transportation belt portion comes to lie once below the at least one dispensing element. The dwell time can also be in the range from 1 hour to 4 hours.

Said conveying length of the excrement transportation belt is preferably at most 140 meters or at most 100 meters, in particular at most 70 meters. In the case of comparatively long facilities, it is conceivable for two or a plurality of excrement-drying installations to be disposed behind one another.

The conveying length is preferably an integer multiple of the sub-length.

The excrement-drying installation furthermore preferably comprises a measuring device for determining the degree of drying of the excrement, wherein the measuring device is disposed in the operative region of the dispensing element. The measuring device has the advantage that the excrement transportation belt upon reaching a desired degree of drying In one particularly preferred variant a plurality of excrement transportation belts, or drying belts, having associated dispensing elements are disposed on top of one another.

A mesh base, or a closed base, is preferably disposed above the excrement transportation belt in the installed position.

The at least one dispensing element is preferably disposed above the excrement transportation belt, or the drying belt, respectively.

The excrement-drying installation furthermore preferably comprises a controller by way of which the excrement transportation belt is actuatable in such a manner that the excrement transportation belt, or the drying belt, respectively, is in each case displaceable in a cycled manner by one advancing length which corresponds to a fraction of the entire conveying length.

Preferably, said advancing length of one cycle preferably corresponds substantially to the length of said excrement transportation belt portion when viewed in the conveying direction. This means that in each case one excrement transportation belt portion of the excrement transportation belt is advanced into the operative region per cycle, and a subsequent excrement transportation belt portion of the excrement transportation belt is subsequently advanced into the operative region.

A barn installation comprises an excrement-drying installation according to the description above, and furthermore, when viewed in the conveying direction, a pelletizing device disposed downstream of the excrement drying installation, the dried excrement being capable of being compressed so as to form pellets by way of said pelletizing device A method for operating an excrement-drying installation according to the description above is characterized in that the excrement transportation belt having the excrement lying thereon is moved in a cycled manner by said excrement transportation belt portion such that a first excrement transportation belt portion having excrement to be dried comes to lie in the operative region of said dispensing element, wherein the excrement transportation belt after a specific dwell time is moved onward by said excrement transportation belt portion in the conveying direction such that a second excrement transportation belt portion having excrement to be dried comes to lie in the operative region of said dispensing element, wherein the dried excrement of the first excrement transportation belt portion is discharged from the excrement transportation belt.

A method for operating an excrement-drying installation according to the description above with the separate drying belt is characterized in that the the excrement transportation belt having the excrement lying thereon is moved in a cycled manner by said excrement transportation belt portion such that the excrement is moved onto the separate drying belt, such that the excrement to be dried comes to lie in the operative region of said dispensing element, wherein the drying belt after a specific dwell time is moved onward by said excrement transportation belt portion in the conveying direction such that excrement of a second excrement transportation belt portion comes to lie in the operative region of said dispensing element, wherein the dried excrement of the first excrement transportation belt portion is discharged from the drying belt.

Said dwell time is preferably in the range from 1 to 6 hours, in particular in the range from 1 to 4 hours.

The method is preferably carried out over a period of 24 hours.

Further embodiments are specified in the dependent claims.

BRIEF DESCRIPTION OF THE FIGURES

Preferred embodiments of the invention will be described hereunder by means of the drawings which serve only for the purpose of explanation and are not intended to be interpreted as limiting. In the drawings.

DESCRIPTION OF PREFERRED EMBODIMENTS

Figure 1:
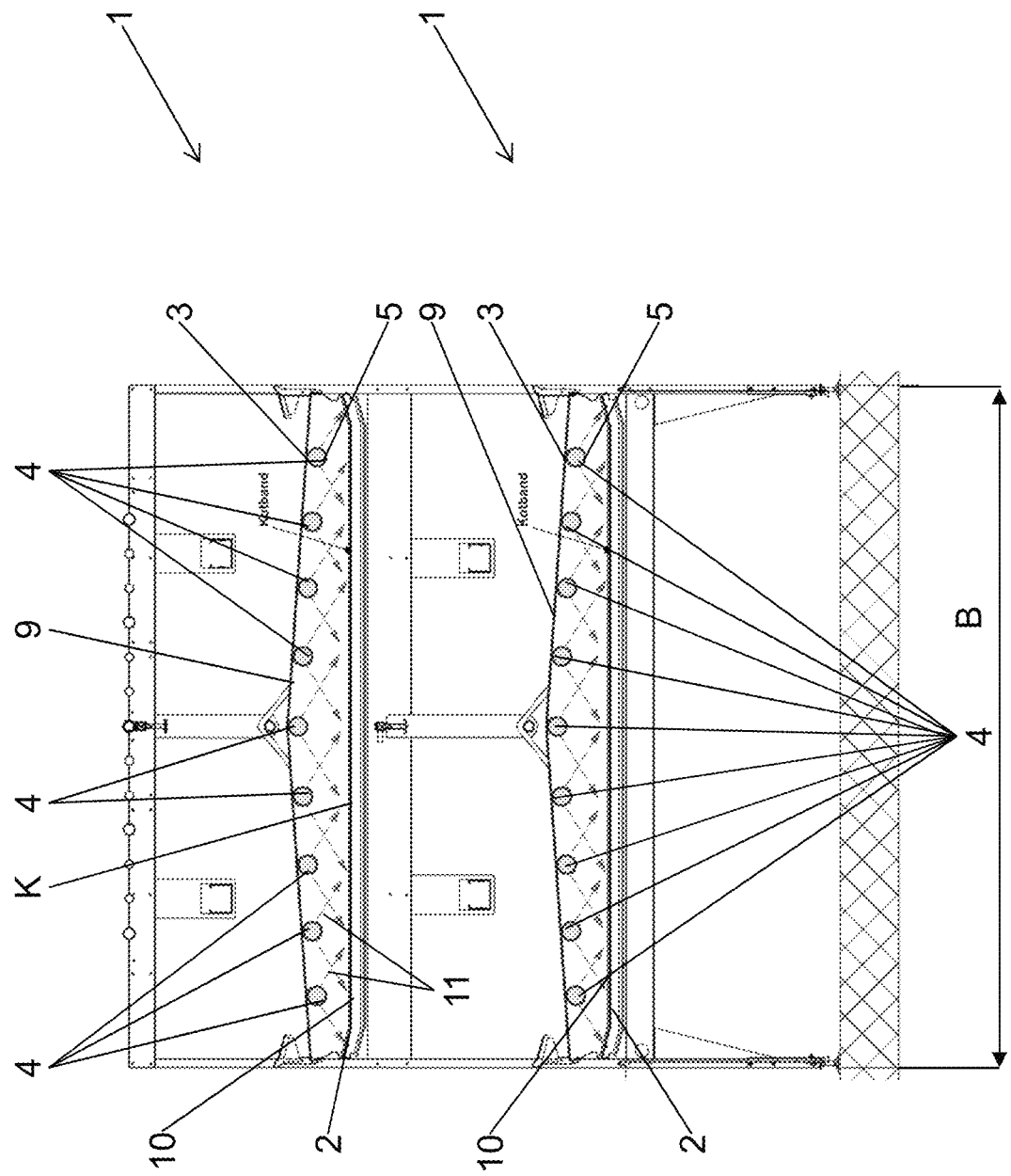
FIG. 1 shows a front view of an excrement-drying installation according to a first embodiment of the present invention.
Figure 2:
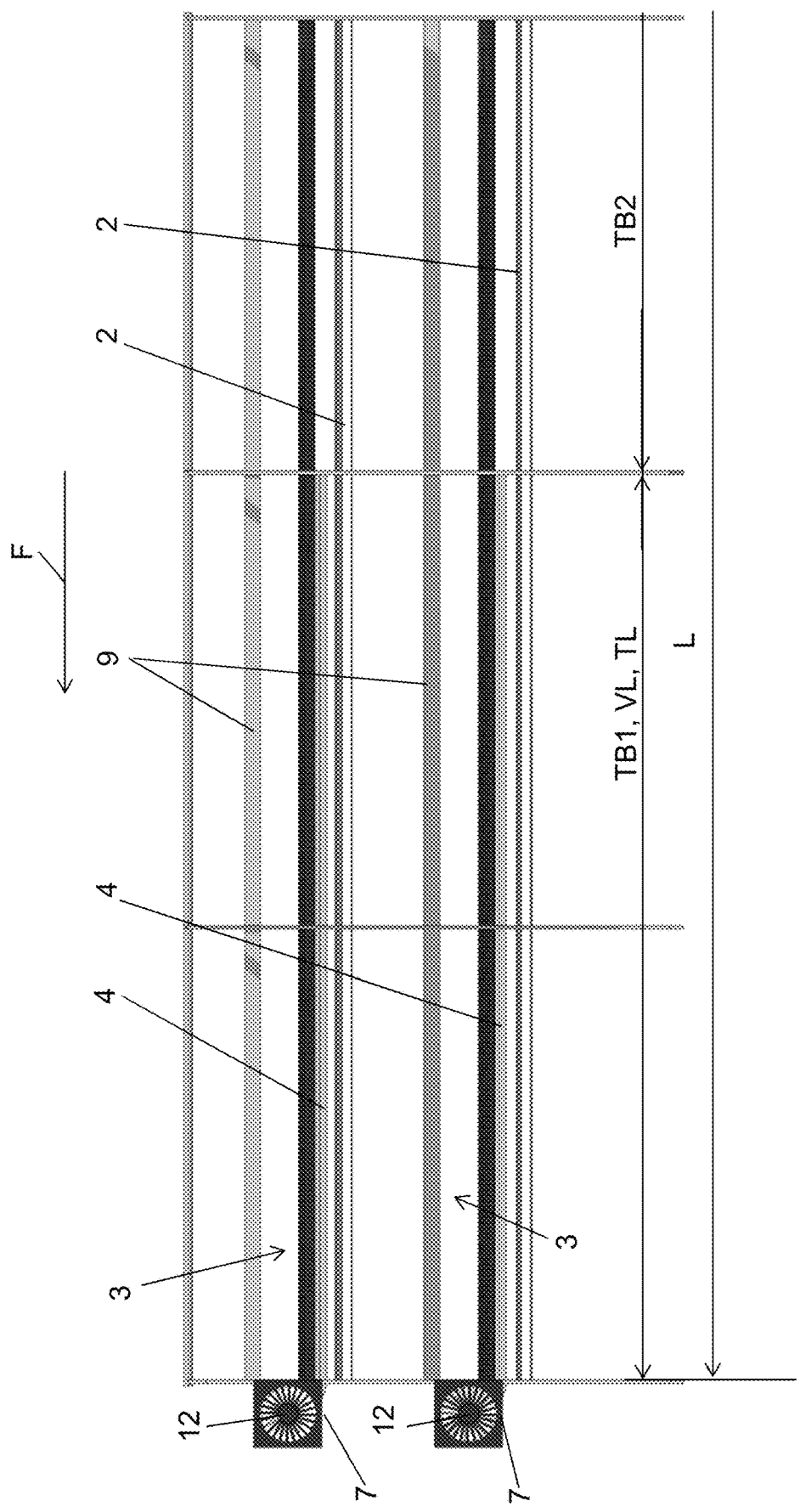
FIG. 2 shows a lateral view of the excrement-drying installation according to FIG. 1.

Various views of an excrement-drying installation 1 for livestock barns, in particular for poultry barns, are shown in FIGS. 1 to 15. FIGS. 1 to 5 herein show views of a first embodiment, FIGS. 6 to 10 show figures of a second embodiment, and FIGS. 11 to 15 show figures of a third embodiment. Identical parts herein are provided with the same reference signs.

The excrement-drying installation 1 comprises an excrement transportation belt 2 for conveying the excrement K along a conveying direction F, and a drying unit 3 for spraying air onto the excrement K lying on the excrement transportation belt 2 for drying the excrement K.

The excrement transportation belt 2 extends across a conveying length L and for receiving the excrement K has an upper side 10. The drying unit 3 comprises at least one dispensing element 4 which has at least one air nozzle 5 for spraying the excrement K lying on the excrement transportation belt 2 with air.

The upper side 10 of the excrement transportation belt 2 for receiving the excrement K is divided into a plurality of excrement transport belt portions TB1, TB2 which lie behind one another in the conveying direction F. The at least one dispensing element 4 herein is disposed in such a manner that only one of said excrement transportation belt portions TB1, TB2 is sprayed with air by said dispensing element 4. The corresponding excrement transportation belt portions TB1, TB2 are plotted in FIGS. 2 and 3, and 7 to 9, and 11 to 15, respectively. The second excrement transportation belt portion TB2 adjoins the first excrement transportation belt portion TB1 counter to the conveying direction F. In the embodiment shown in the figures, the first excrement transportation belt portion TB1 is now situated in the operative region of the drying unit 3, or of the dispensing elements 4, respectively. The second excrement transportation belt portion TB2 lies outside said operative region. Consequently, the air is applied exclusively to the first excrement transportation belt portion TB1 but not to the second excrement transportation belt portion TB2.

In other words, each of the excrement transportation belt portions occupies a sub-area of the total upper side of the excrement transportation belt, and the at least one dispensing element is disposed in such a manner that said dispensing element acts on an operative region which in terms of area corresponds to said sub-area.

The drying unit in the embodiment shown is disposed the excrement transportation belt and thus acts directly on the upper side of the excrement transportation belt 2. In the first and the second embodiment, the drying unit, or the dispensing elements 4, respectively, lies/lie directly above the first excrement transportation belt portion TB1, while the drying unit, or the dispensing elements 4, respectively, in the third embodiment is/are disposed so as to be lateral to the excrement transportation belt portion TB1. In an embodiment not shown, the drying unit is disposed above a drying belt which is configured separately from said excrement transportation belt, wherein the drying belt preferably has a length which corresponds to said excrement transportation belt portion. The explanations made herein apply in analogous manner to both variants.

In the first and the second embodiment shown, a plurality of dispensing elements 4 are disposed so as to be parallel beside one another and thus spray the entire width of the excrement transportation belt portion TB1. This can be seen in particular in FIGS. 1 and 6. The arrows having the reference sign 11 herein symbolize the airflows. The air flow 11 extends from the dispensing element 4 to the upper side 10 of the excrement transportation belt 2. In the third embodiment, a plurality of dispensing elements 4 are disposed so as to be laterally beside the excrement transportation belt 2 and spray the air laterally onto the upper side 10 of the excrement transportation belt 2, this being shown in FIG. 13.

The dispensing element 4 in all three embodiments shown is disposed so as to be locationally fixed in relation to the excrement transportation belt 2. This means that the dispensing element 4 does not move in relation to the excrement transportation belt 2. However, the excrement transportation belt 2 moves relative to the fixed dispensing element 4.

In the first embodiment shown according to FIGS. 1 to 5, the at least one dispensing element 4 is disposed in the region of the end 8 of the excrement transportation belt 2. The end 8 defines the region in which the dried excrement is guided away from the excrement transportation belt 2. The dispensing elements 4 herein extend from the end 8 of the excrement transportation belt 2, counter to the conveying direction F, across the upper side 10 of the excrement transportation belt 2.

In the embodiment shown, the at least one dispensing element 4 extends to the conveying direction F and lies so as to be spaced apart from the upper site 10 of the excrement transportation belt 2.

The second embodiment of the present invention is shown in FIGS. 6 to 10. Identical parts are provided with the same reference signs and reference is made to the description above in the context of the first embodiment. The main difference to the first embodiment lies in that the dispensing elements 2 in the case of the second embodiment is not oriented in the conveying direction of the excrement transportation belt 2 but transversely to the latter. The collector pipe 7 lie so as to be lateral to the excrement transportation belt 2, and the dispensing elements 4 extend so as to be substantially orthogonal to the collector pipe 7.

The third embodiment of the present invention is shown in FIGS. 11 to 15. Identical parts are provided with the same reference signs, and reference is made to the description above in the context of the first embodiment. Here, a plurality of dispensing elements 4 are disposed so as to be lateral to the excrement transportation belt 2. It can be readily seen in FIG. 11 that the dispensing elements 4 are disposed in an alternating manner to the left and to the right of the excrement transportation belt 2. This means that a dispensing element 4 disposed on the right side, when viewed in the conveying direction F, is followed by a dispensing element 4 disposed on the left side, and so forth.

Each of the dispensing elements according to the third embodiment comprises at least one ventilator by way of which the dispensing element 4 can suction air from the environment for the air nozzles 5 on the dispensing elements 4. The air nozzle is preferably a gap which, when viewed in the conveying direction F, extends substantially across the entire length of the respective dispensing element. The air nozzles 5 herein are configured in such a manner that said air nozzles 5 effect an air flow onto the upper side 10 of the respective excrement transportation belt 2 such that the excrement K can be correspondingly dried.

Figure 3:
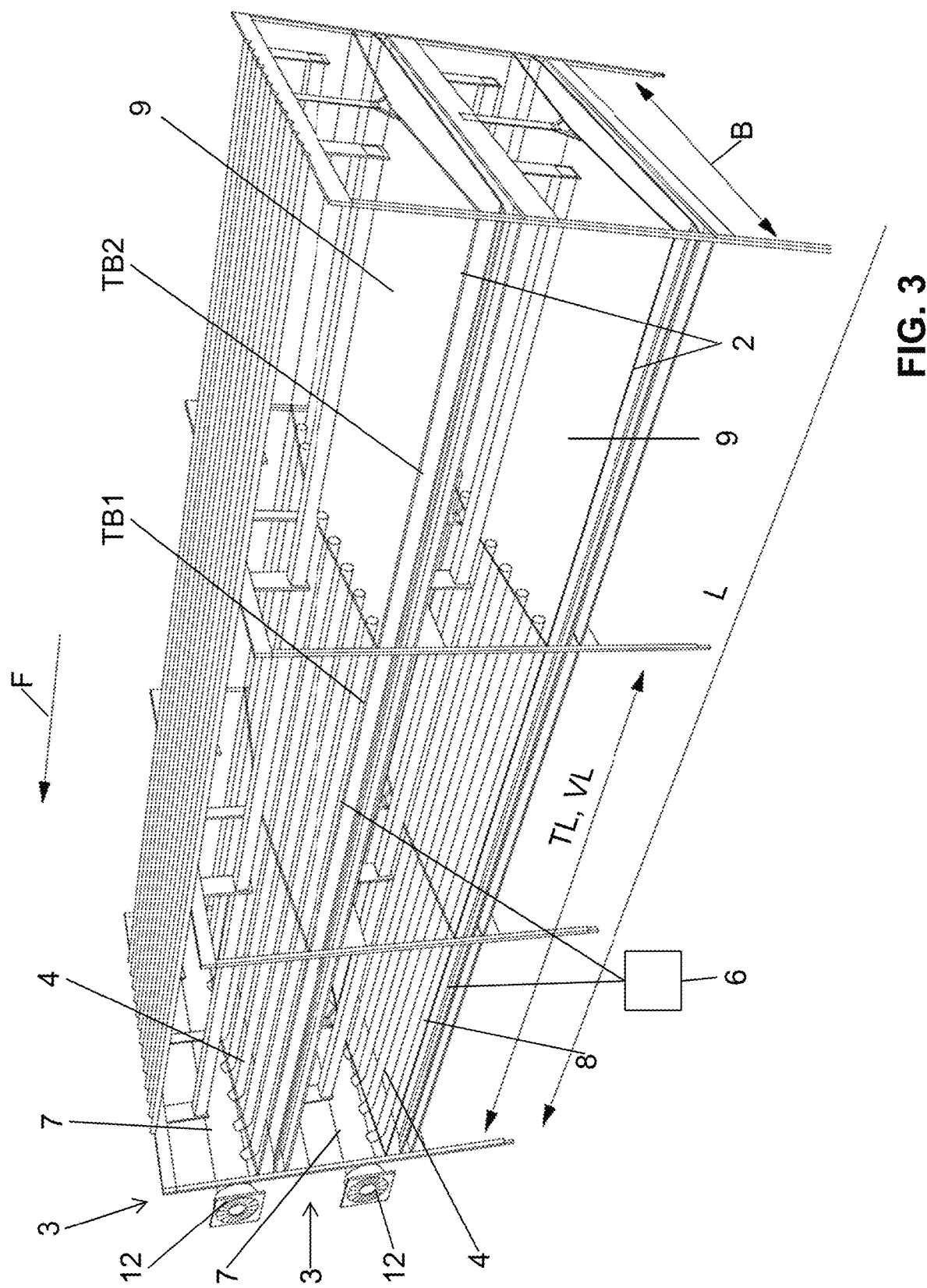
FIG. 3 shows a perspective view of the excrement-drying installation according to FIG. 1.

The excrement-drying installation 1 according to all embodiments furthermore comprises a controller 6 which is symbolically illustrated in FIG. 3. The excrement transportation belt 2 by way of the controller 6 is actuatable in such a manner that the excrement transportation belt 2 is in each case displaceable in a cycled manner by an advancing length VL which corresponds to a fraction of the entire conveying length L. This means that the excrement transportation belt 2 can in each case be displaced by the advancing length VL. The advancing length VL preferably corresponds to the length of the excrement transportation belt portion TB1, TB2 when viewed in the conveying direction F.

The dispensing element 4 in the first and the second embodiments is particularly preferably a pipe which in a corresponding manner lies above the excrement transportation belt 2. The pipe can have a round or an angular cross section.

A multiplicity of dispensing elements 4 are disposed in the first and second embodiments shown. The dispensing elements 4 herein run so as to be mutually parallel and parallel or transverse to the conveying direction F. The dispensing elements 4 are disposed in a uniformly spaced manner to each other.

In the first embodiment shown according to FIGS. 1 to 5, one dispensing element 4 is disposed so as to be centric in the conveyor belt, and the further dispensing elements 4 lie to the left and to the right, respectively, in relation to the centric dispensing element 4. In the embodiment shown, the dispensing elements 4 in terms of the upper side 10 of the excrement transportation belt 2 are placed such that the distance between the upper side 10 of the excrement transportation belt 2 and the dispensing elements 4, when viewed to the conveying direction F, decreases toward the outside as the distance from the center of the excrement transportation belt increases.

In the second embodiment shown according to FIGS. 6 to 10, the dispensing elements 4 lie at a consistent distance from the upper side 10 of the excrement transportation belt 2.

Each dispensing element 4 comprises a plurality of nozzles 5 which, when viewed in the direction of the conveying direction F, are disposed at a distance of in each case 2 to 5 cm from each other. The diameter of the nozzles is preferably in the range of 4 to 20 mm. The nozzles 5 herein are configured in such a manner that said nozzles 5 effect an airflow onto the upper side 10 of the respective excrement transportation belt 2 such that the excrement K can be correspondingly dried.

In the first and the second embodiment shown, the dispensing elements 4 are fluidically connected to a collector pipe 7. The dispensing elements 4 can be supplied with air by way of the collector pipe 7. A collector pipe could also be provided instead of the ventilators in the third embodiment.

The collector pipe 7 in the first embodiment according to FIGS. 1 to 5 is oriented transversely to the conveying direction of the excrement transportation belt 2. The collector pipe 7 herein is disposed in the end region of the excrement transportation belt 2. In the second embodiment according to FIGS. 6 to 10, the collector pipe 7 is disposed so as to be lateral to the excrement transportation belt 2.

A ventilator 12 which suctions air and then feeds said air to the dispensing elements 4 by way of the collector pipe 7 is disposed upstream of the collector pipe 7 in the embodiment shown.

Each excrement transportation belt portion TB in all embodiments described herein, when viewed in the conveying direction F, preferably has a length TL in the range from 3 to 6 meters. The length TL of said excrement transportation belt portion TB in the conveying direction F is preferably chosen in such a manner that in one complete revolution of the excrement transportation belt 2 each excrement transportation belt portion within 24 hours comes to lie once below the at least one dispensing element 4 at a dwell time of 1 to 6 hours.

The maximum conveying length L is preferably 100 meters, in particular at most 70 meters.

The excrement-drying installation 1 in the embodiments shown furthermore comprises a mesh base 9 on which the livestock can move around. In the embodiment shown, the corresponding mesh base 9 is in each case disposed in the installed position above the dispensing element 4. Instead of the mesh base, a fully planar structure can also be disposed.

It can be seen in FIGS. 1 to 3, and 6 to 9, and 11 to 15 that two excrement-drying installations 1 are disposed on top of one another here. The space for the livestock can thus be optimized in a corresponding manner.

Figure 4:
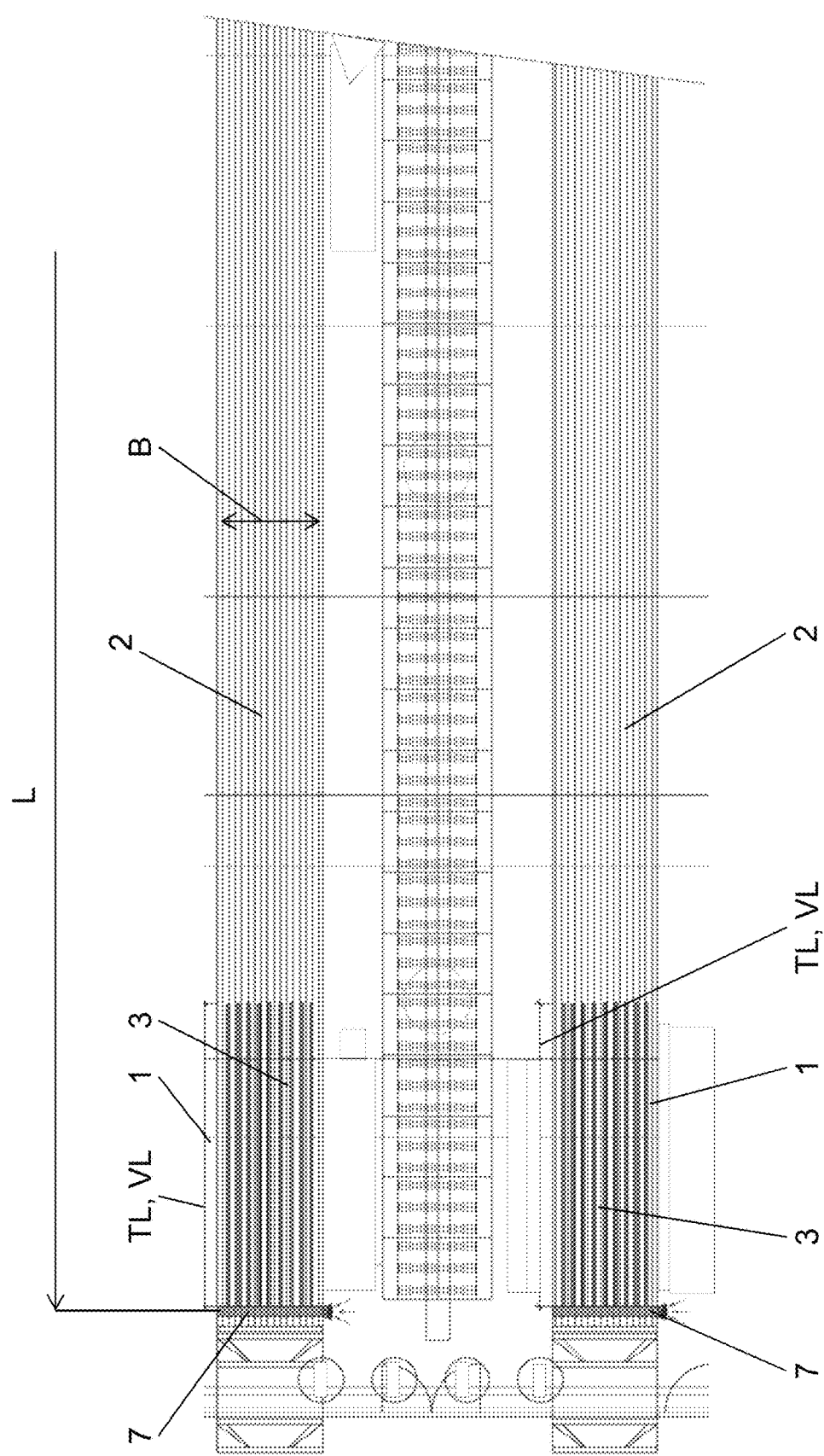
FIG. 4 shows a plan view of an arrangement according to a first variant of an excrement-drying installation according to the preceding figures in a barn.
Figure 10:
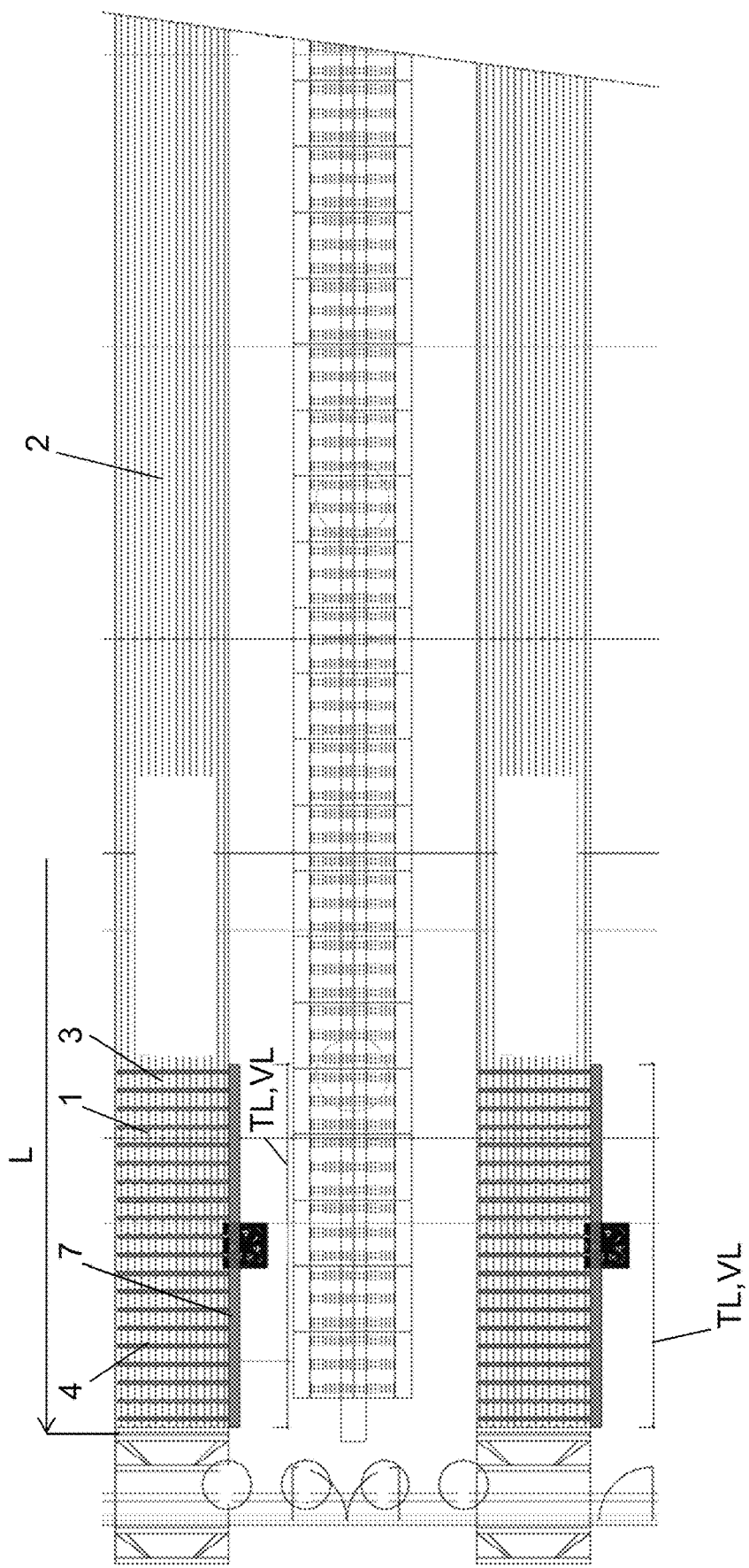
FIG. 10 shows a plan view of an arrangement according to a first variant of an excrement-drying installation according to preceding FIGS. 6 to 9 in a barn.
Figure 11:
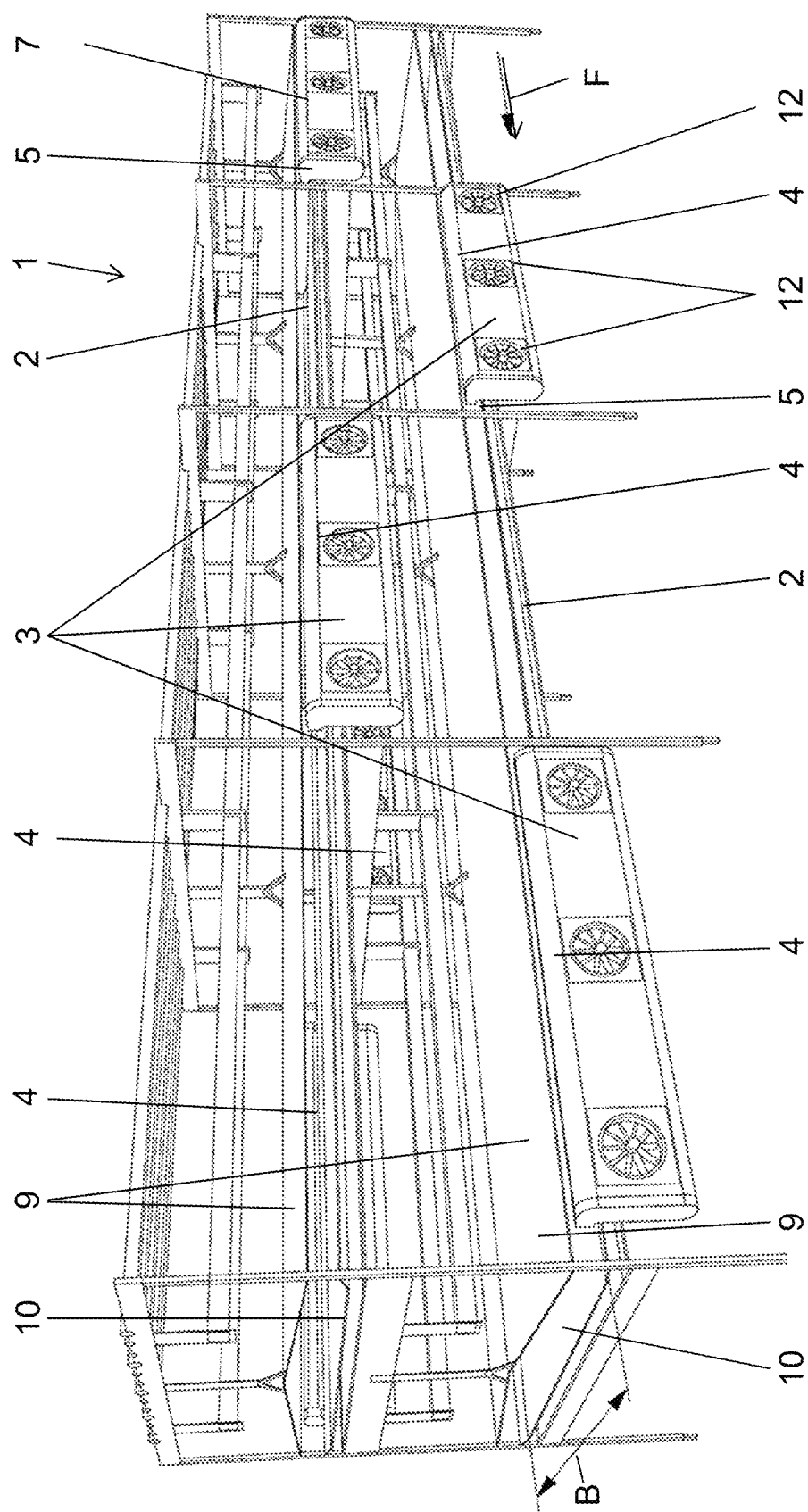
FIG. 11 shows a perspective view of an excrement-drying installation according to a third embodiment of the present invention.
Figure 12:
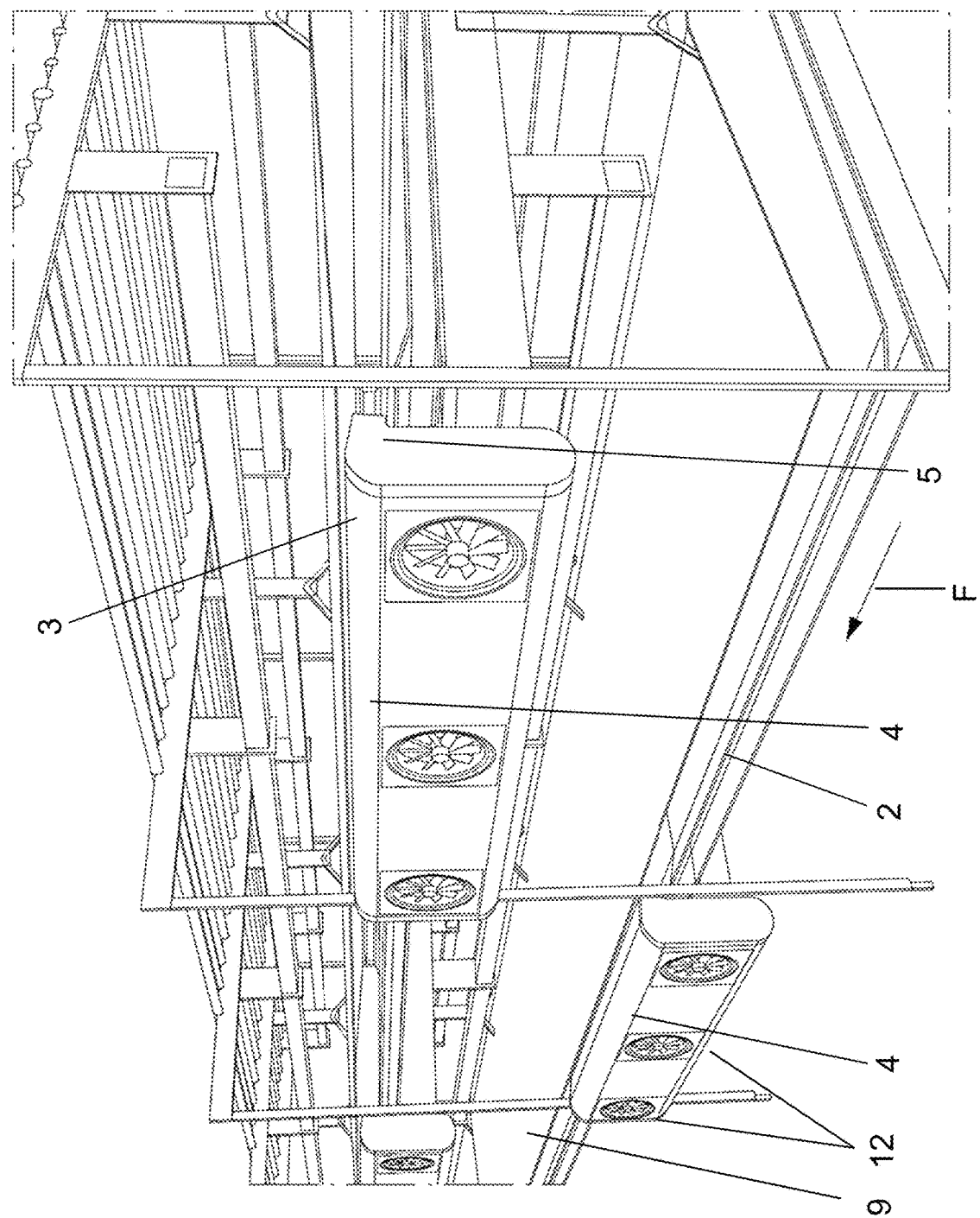
FIG. 12 shows a perspective view of the detail of FIG. 11.
Figure 13:
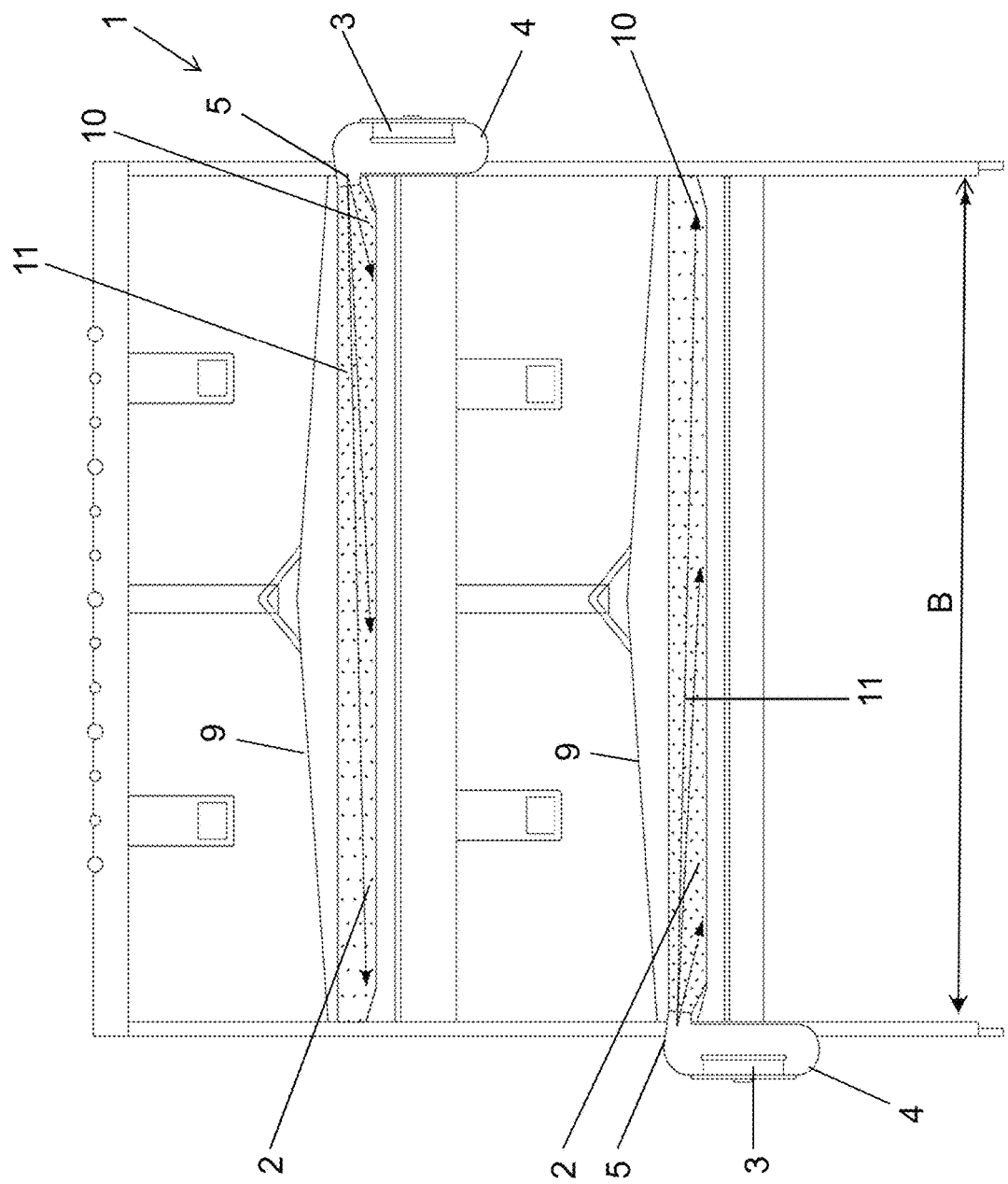
FIG. 13 shows a front view of the third embodiment according to FIGS. 11 to 12.
Figure 14:
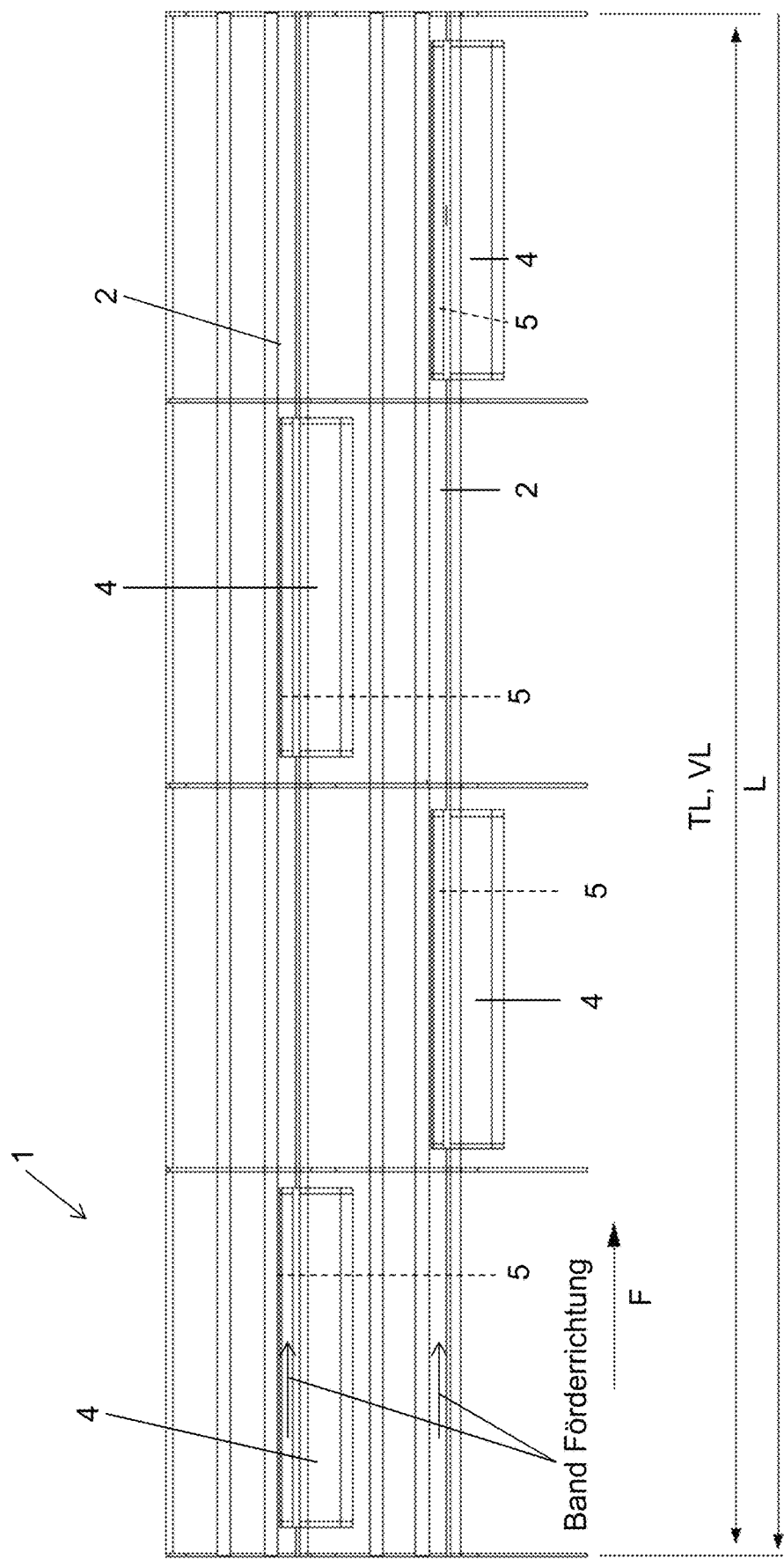
FIG. 14 shows a lateral view of the third embodiment according to FIGS. 11 to 13.
Figure 15:
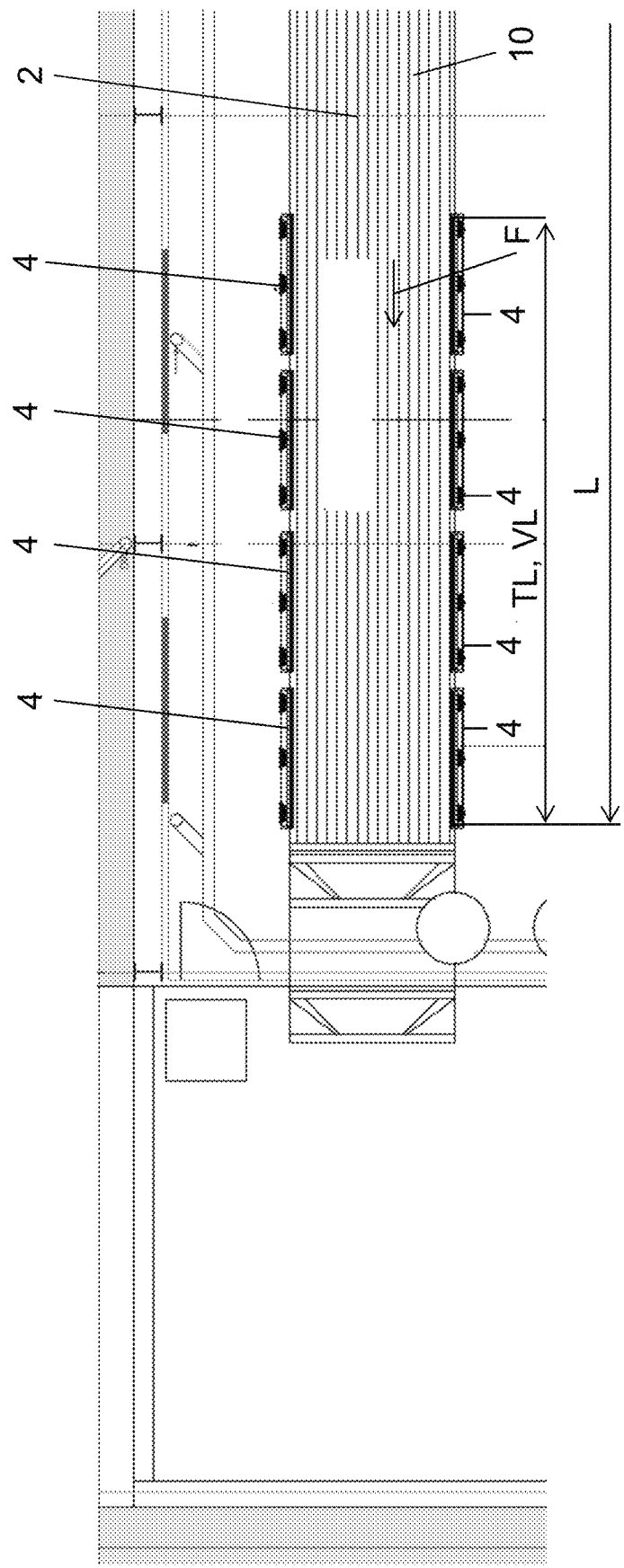
FIG. 15 shows a plan view of the third embodiment according to FIGS. 11 to 13.

A parallel arrangement of two excrement-drying installations 1 beside one another is shown in FIGS. 4 and 10. It can be readily seen here that the dispensing elements 4 are disposed in such a manner that said dispensing elements 4 cover only an excrement transportation belt portion, thus a sub-region of the excrement transportation belt 2.

Figure 5:
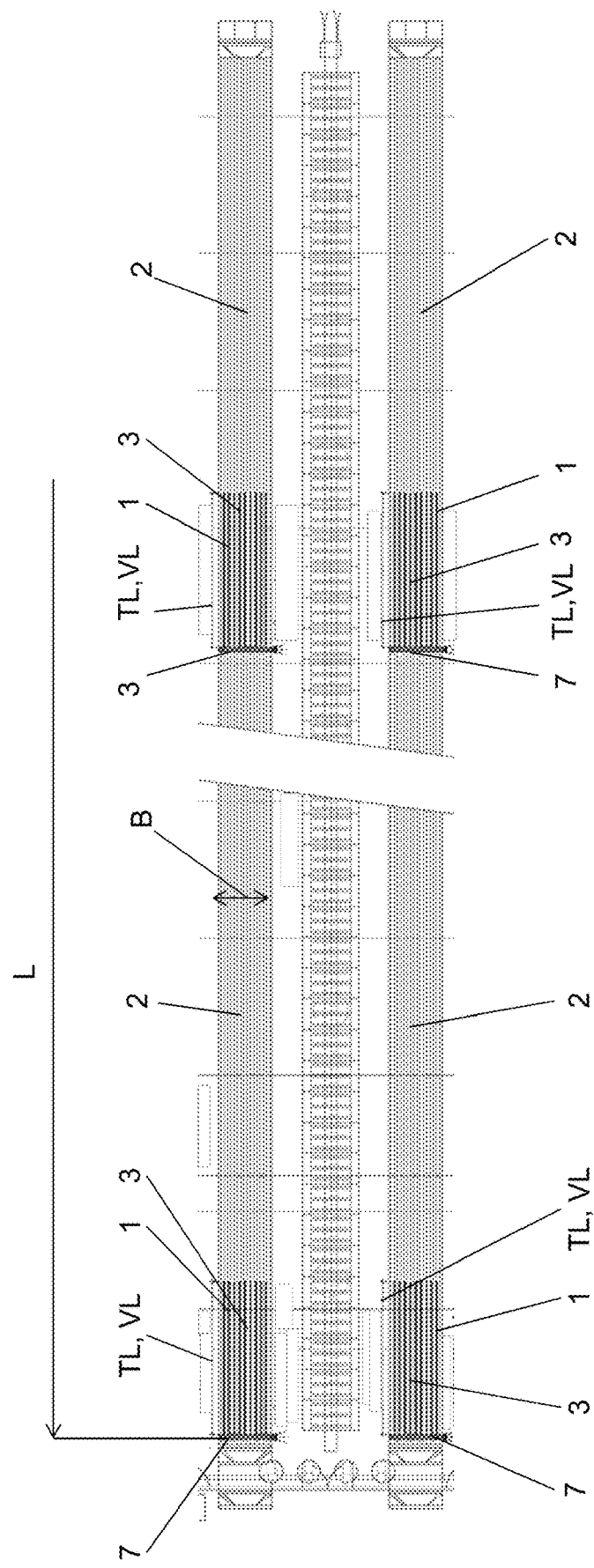
FIG. 5 shows a plan view of an arrangement according to a second variant of an excrement-drying installation according to the preceding figures in a barn.
Figure 6:
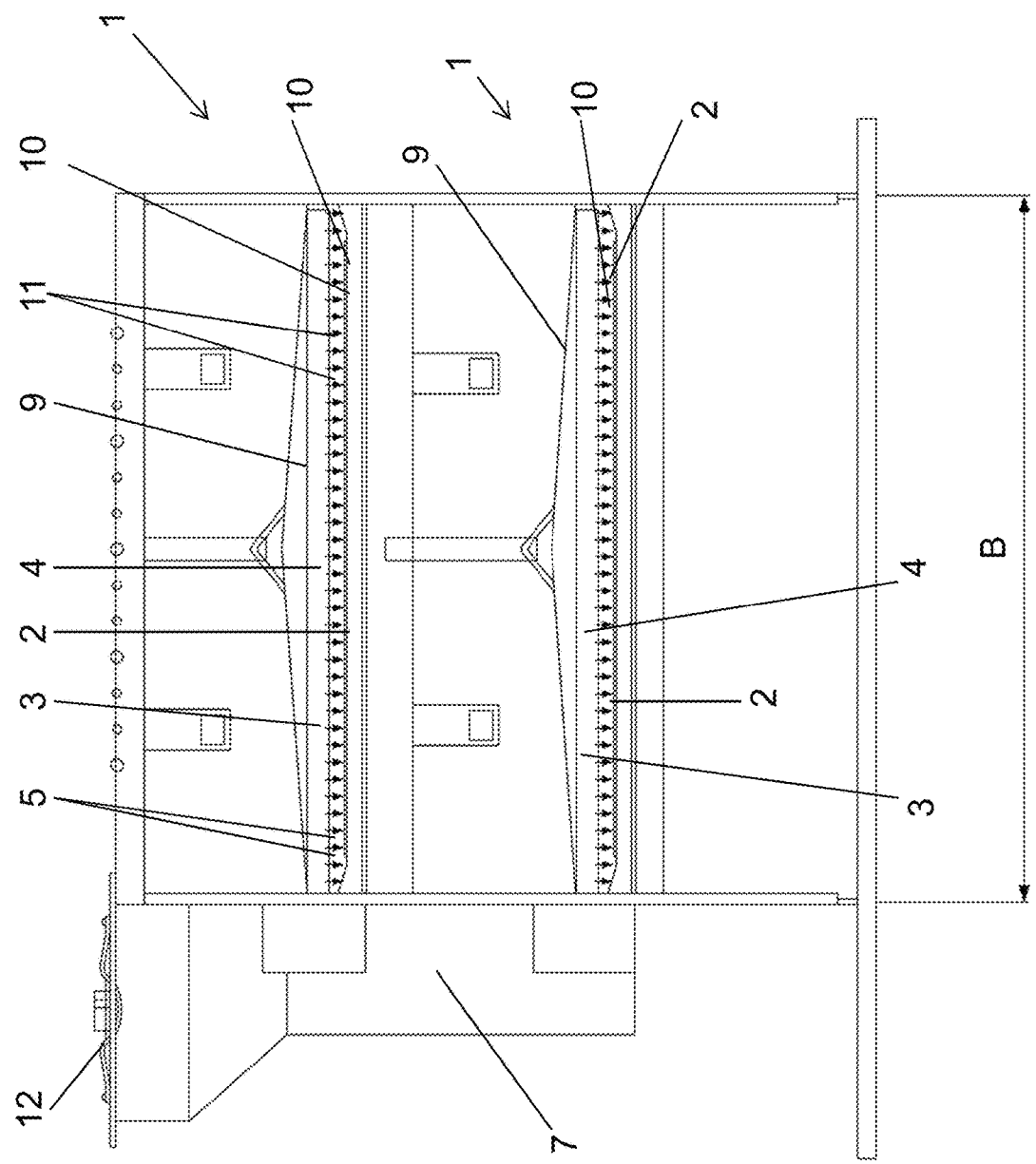
FIG. 6 shows a front view of an excrement-drying installation according to a second embodiment of the present invention.
Figure 7:
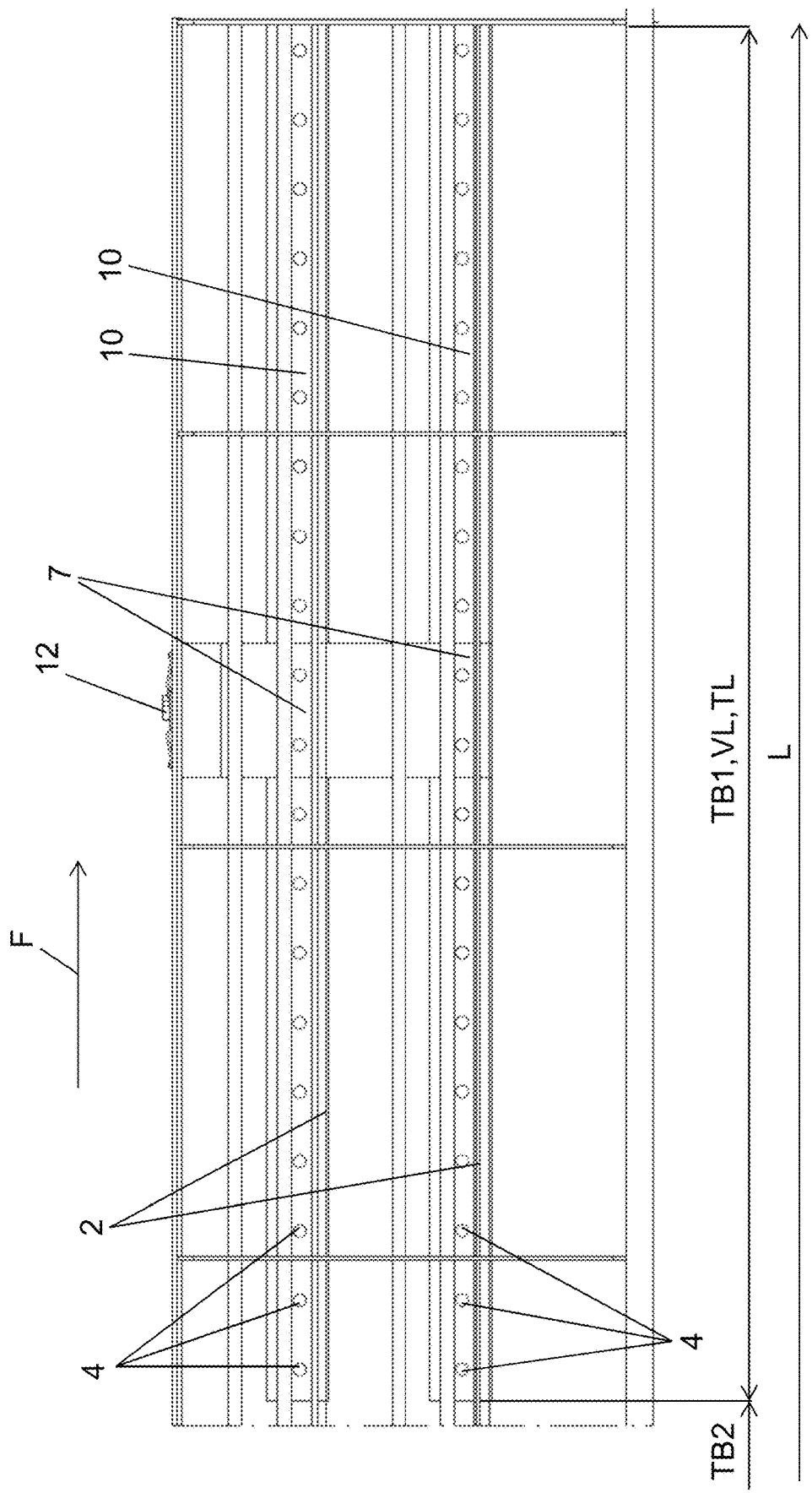
FIG. 7 shows a lateral view of the excrement-drying installation according to FIG. 6.
Figure 8:
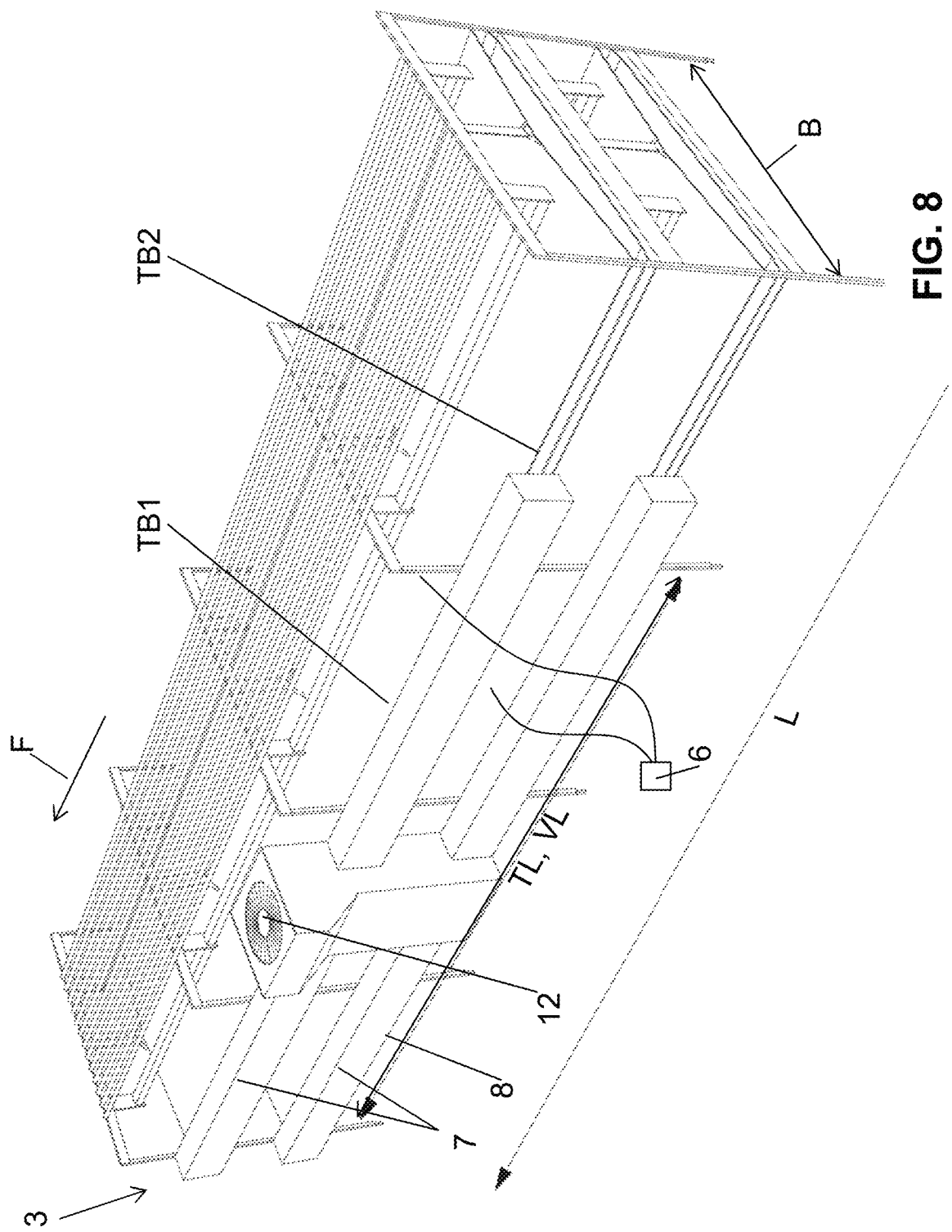
FIG. 8 shows a perspective view of the excrement-drying installation according to FIG. 6.
Figure 9:
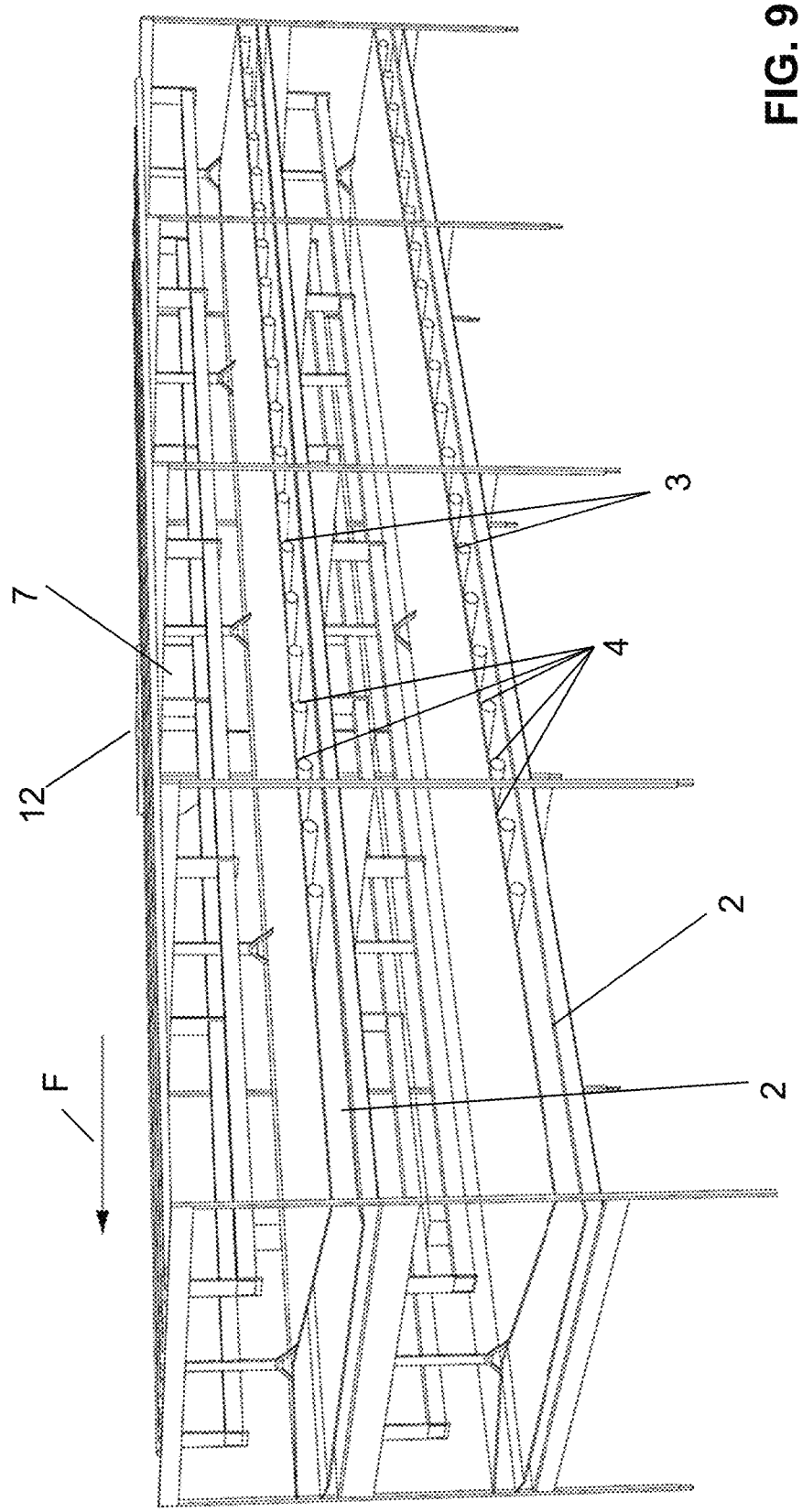
FIG. 9 shows a further perspective view of the excrement-drying installation according to FIG. 6.

A double arrangement of two excrement-drying installations 1 behind one another and beside one another is then shown in FIG. 5. A particularly long barn can be supplied by way of a configuration of this type with the corresponding excrement-drying installation 1. The arrangement according to the first embodiment is illustrated in FIG. 5. The same configuration is also possible according to the second embodiment.

A method for operating an excrement-drying installation according to the description above is characterized in that the excrement transportation belt 2 having the excrement K lying thereon is moved in a cycled manner by said excrement transportation belt portion TB such that a first excrement transportation belt portion TB1 having excrement K to be dried comes to lie in the operative region of said dispensing element 4, wherein the excrement transportation belt 2, after a specific dwell time, is moved onward by said excrement transportation belt portion TB in the conveying direction F such that a second excrement transportation belt portion TB2 having excrement to be dried comes to lie in the operative region of said dispensing element 4, wherein the dried excrement K of the first excrement transportation belt portion TB2 is discharged from the excrement transportation belt 2.

The dwell time is in the range from 1 hour to 6 hours, in particular in the range from 1 to 4 hours. The method is preferably carried out over a period of 24 hours.

LIST OF REFERENCE SIGNS

1 Excrement-drying installation
2 Excrement transportation belt
3 Drying unit
4 Dispensing element
5 Air nozzle
6 Controller
7 Collector pipe
8 End
9 Mesh base
10 Upper side
11 Air
12 Ventilator
TB Excrement transportation belt portion
B Width
F Conveying direction
L Conveying length
TL Sub-length
VL Advancing length

The invention claimed is:

1. An excrement-drying installation for livestock barns such as poultry barns, comprising:
   an excrement transportation belt or a drying belt, respectively for conveying excrement along a conveying direction, wherein the excrement transportation belt extends across a conveying length and has an upper side for receiving the excrement; and
   a drying unit having at least one dispensing element which for drying the excrement has at least one air nozzle or a multiplicity of air nozzles for spraying air onto the excrement lying on the excrement transportation belt,
   wherein the upper side of the excrement transportation belt for receiving the excrement is divided into a plurality of excrement transportation belt portions which lie behind one another in the conveying direction, wherein each excrement transportation belt portion occupies a sub-area of a total upper side, and
   wherein the at least one dispensing element is disposed in such a manner that said dispensing element acts on an operative region which in terms of area corresponds to said sub-area
   wherein a length of said excrement transportation belt portion, when viewed in the conveying direction, is chosen in such a manner that in one complete revolution of the excrement transportation belt within 24 hours, at a dwell time of 1 to 6 hours, each excrement transportation belt portion comes to lie below the at least one dispensing element.

2. The excrement-drying installation as claimed in claim 1, wherein the excrement transportation belt portion, or the sub-area, respectively, extends across an entire width and across a sub-length of the excrement transportation belt.

3. The excrement-drying installation as claimed in claim 1,
   wherein the at least one dispensing element is disposed in such a manner that the entire width of the excrement transportation belt, or of the drying belt, respectively, is capable of being sprayed with air, or wherein the at least one dispensing element extends within the excrement transportation belt portion; or wherein the at least one dispensing element extends within the excrement transportation belt portion and is disposed in such a manner that the entire width of the excrement transportation belt, or of the drying belt, respectively, is capable of being sprayed with air.

4. The excrement-drying installation as claimed in claim 2, wherein the at least one dispensing element is disposed in such a manner that an entire width of the excrement transportation belt, or of the drying belt, respectively, is capable of being sprayed with air, or wherein the at least one dispensing element extends within the excrement transportation belt portion; or wherein the at least one dispensing element extends within the excrement transportation belt portion and is disposed in such a manner that the entire width of the excrement transportation belt, or of the drying belt, respectively, is capable of being sprayed with air.

5. The excrement-drying installation as claimed in claim 1, wherein the dispensing element is disposed so as to be locationally fixed in relation to the excrement transportation belt, or the drying belt, respectively, wherein the excrement transportation belt, or the drying belt, respectively, moves relative to the fixed dispensing element, and/or wherein the dispensing element is disposed in the end region of the excrement transportation belt, and/or wherein the at least one dispensing element extends from the end of the excrement transportation belt, or of the drying belt, respectively, counter to the conveying direction, and/or wherein the at least one dispensing element extends from one or both sides of the excrement transportation belt, or of the drying belt, respectively, transversely to the conveying direction.

6. The excrement-drying installation as claimed in claim 1, wherein the at least one dispensing element extends parallel to and/or transversely to the conveying direction so as to be spaced apart from an upper side of the excrement transportation belt, or the drying belt, respectively, and/or wherein the at least one dispensing element has a shape of a pipe.

7. The excrement-drying installation as claimed in claim 1, wherein a multiplicity of dispensing elements are disposed, wherein the dispensing elements run so as to be parallel to each other and parallel to the conveying direction, and/or wherein the dispensing elements run so as to be parallel to each other and transverse to the conveying direction, wherein the dispensing elements are disposed at uniform mutual spacings beside one another, so as to proceed from a center of the excrement transportation belt, or of the drying belt, respectively, and/or wherein the spacing between the upper side of the excrement transportation belt, or of the drying belt, respectively, and the dispensing elements, when viewed transversely to the conveying direction, decreases toward an outside, as the spacing from the center of the excrement transportation belt, or of the drying belt, respectively, increases.

8. The excrement-drying installation as claimed in claim 1, wherein a plurality of nozzles, when viewed in the direction of the conveying direction, and/or transversely to the conveying direction, are disposed at a spacing of 2 to 5 centimeters between each other, and/or wherein the nozzles have a diameter of 4 to 20 millimeters; and/or wherein the nozzle is a nozzle slot.

9. The excrement-drying installation as claimed in claim 1, wherein the at least one dispensing element is disposed so as to be lateral to the excrement transportation belt, or beside the excrement transportation belt, respectively, and wherein the at least one air nozzle sprays the excrement transportation belt transversely to the conveying direction.

10. The excrement-drying installation as claimed in claim 9, wherein a plurality of dispensing elements are disposed behind one another in the conveying direction.

11. The excrement-drying installation as claimed in claim 9, wherein the dispensing elements are disposed on both sides to a left side and a right side of the excrement transportation belt, and wherein the dispensing elements in terms of the conveying direction are disposed in a mutually alternating or a mutually opposite manner.

12. The excrement-drying installation as claimed in claim 9, wherein a plurality of dispensing elements are disposed behind one another in the conveying direction, wherein the dispensing elements are disposed on both sides to the left and right of the excrement transportation belt, and wherein the dispensing elements in terms of the conveying direction are disposed in a mutually alternating or a mutually opposite manner.

13. The excrement-drying installation as claimed in claim 9, wherein the dispensing elements have air nozzles in shape of slots, or in shape of sequentially disposed nozzle openings, wherein the air nozzles are oriented in the conveying direction, and/or wherein the dispensing elements comprise at least one ventilator which suctions ambient air and dispenses the ambient air by way of the air nozzles, and/or wherein the at least one dispensing element is disposed so as to be locationally fixed in relation to the excrement transportation belt, or of the drying belt, respectively, and wherein the excrement transportation belt, or the drying belt, respectively, moves relative to the dispensing element which is arranged fixedly.

14. The excrement-drying installation as claimed in claim 1, wherein the drying unit comprises a collector pipe which is fluidically connected to the at least one dispensing element, and wherein the at least one dispensing element is supplied with air by way of the collector pipe.

15. The excrement-drying installation as claimed claim 1, wherein said excrement transportation belt portion, or the drying belt, respectively, when viewed in the conveying direction has a length of 3 meters to 6 meters, or up to 10 meters; and/or and/or wherein said conveying length is at most 140 meters, or at most 100 meters, or at most 70 meters.

16. The excrement-drying installation as claimed in claim 1,
wherein the excrement-drying installation furthermore comprises a measuring device for determining the degree of drying of the excrement, and
wherein the measuring device is disposed in the operative region of the dispensing element.

17. The excrement-drying installation as claimed in claim 1,
wherein a plurality of excrement transportation belts, or drying belts, respectively, having associated dispensing elements are disposed on top of one another, and/or
wherein a mesh base is disposed above the excrement transportation belt in the installed state.

18. The excrement-drying installation as claimed in claim 1,
wherein the drying unit is disposed above the excrement transportation belt and thus acts on the excrement transportation belt, or
wherein the drying unit is disposed above a drying belt which is configured separately from said excrement transportation belt, or
wherein the drying unit is disposed above a drying belt which is configured separately from said excrement transportation belt, wherein the drying belt has a length which corresponds to that of said excrement transportation belt portion.

19. The excrement-drying installation as claimed in claim 1, wherein the excrement-drying installation furthermore comprises a controller by way of which the excrement transportation belt, or the drying belt, respectively, is actuatable in such a manner that the excrement transportation belt, or the drying belt, respectively, is in each case displaceable in a cycled manner by one advancing length which corresponds to a fraction of a total conveying length.

20. A barn installation comprising an excrement-drying installation as claimed in claim 1, wherein said barn installation, when viewed in the conveying direction, furthermore comprises a pelletizing device which is disposed downstream of the excrement-drying installation and by way of which the dried excrement is capable of being compressed so as to form pellets.

21. A method for operating an excrement-drying installation as claimed in claim 1,
wherein the excrement transportation belt having excrement lying thereon is moved in a cycled manner by said excrement transportation belt portion such that a first excrement transportation belt portion having excrement to be dried comes to lie in an operative region of said dispensing element, or
wherein the excrement is moved onto a separate drying belt, wherein the excrement transportation belt, or the drying belt, respectively, after a specific dwell time is moved onward by said excrement transportation belt portion in the conveying direction such that excrement of a second excrement transportation belt portion comes to lie in the operative region of said dispensing element, wherein the dried excrement of the first excrement transportation belt portion is discharged from the excrement transportation belt, or from the drying belt, respectively.

22. The method as claimed in claim 21, wherein a dwell time is in the range from 1 to 6 hours, or in the range from 1 to 3 hours, and/or wherein the method is carried out over a period of 24 hours.

* * * * *